(12) United States Patent
Wiesinger

(10) Patent No.: US 6,214,083 B1
(45) Date of Patent: Apr. 10, 2001

(54) METHOD AND PLANT FOR PRODUCING IRON FROM LUMPY AND FINE-PARTICULATE SPONGE IRON

(75) Inventor: Horst Wiesinger, Linz (AT)

(73) Assignee: Voest-Alpine Industrieanlagenbau GmbH, Linz (AT)

( * ) Notice: Subject to any disclaimer, the term of this patent is extended or adjusted under 35 U.S.C. 154(b) by 0 days.

(21) Appl. No.: 09/155,966
(22) PCT Filed: Feb. 10, 1998
(86) PCT No.: PCT/AT98/00027
§ 371 Date: Dec. 11, 1998
§ 102(e) Date: Dec. 11, 1998
(87) PCT Pub. No.: WO98/35064
PCT Pub. Date: Aug. 13, 1998

(30) Foreign Application Priority Data

Feb. 11, 1997 (AT) .......................................... 218/97

(51) Int. Cl.⁷ .................................................... C21B 11/00
(52) U.S. Cl. ................................... 75/446; 75/450; 75/492
(58) Field of Search ............................. 75/492, 446, 445, 75/450; 266/160, 172

(56) References Cited

U.S. PATENT DOCUMENTS 5,989,308 * 11/1999 Kepplinger et al. ................... 75/446

* cited by examiner

Primary Examiner—Melvyn Andrews

(57) ABSTRACT

In a method of producing liquid pig iron or liquid steel pre-products from iron-oxide-containing material, fine-particulate iron-oxide-containing material is reduced to fine-particulate sponge iron by the fluidized bed method by passing a reducing gas through at least one fluidized bed reduction stage (7, 8), and lumpy ore is reduced to lumpy sponge iron in a fixed bed reduction stage (28). The sponge iron is charged into a melting-gasifying zone (11) and is molten there under a supply of carbon carriers and oxygen-containing gas, in which a CO— and $H_2$-containing reducing gas is generated for reducing the iron-oxide-containing material. To avoid treating the fine-particulate sponge iron separately from the lumpy sponge iron, the fine-particulate sponge is charged directly to the melting-gasifying zone (11) in an untreated condition and in fine-particulate form, and there, is melted together with the lumpy sponge iron.

17 Claims, 2 Drawing Sheets

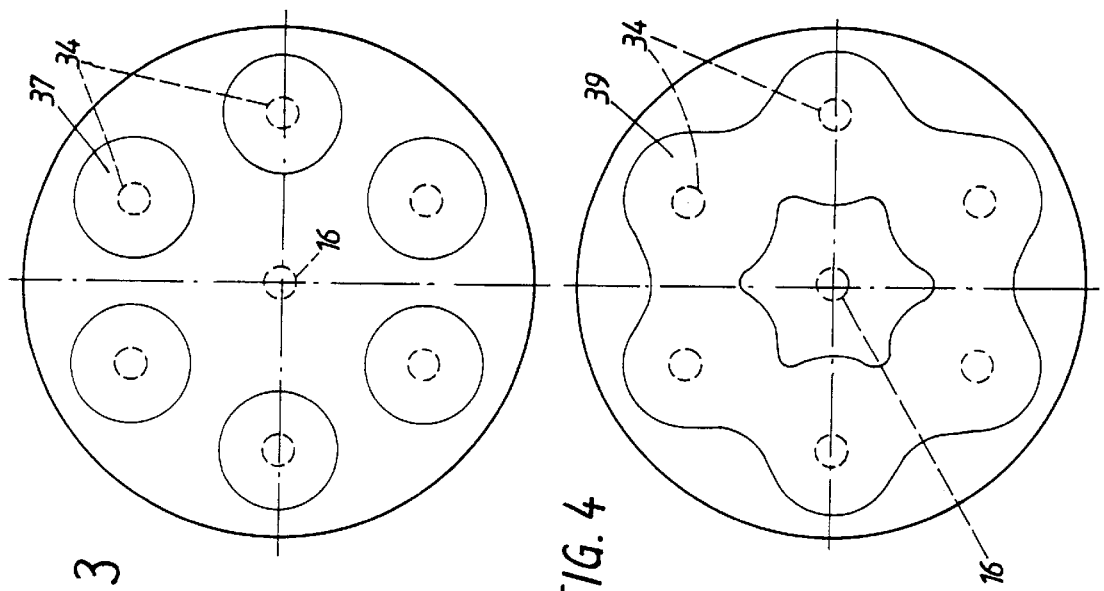
FIG. 3
FIG. 4
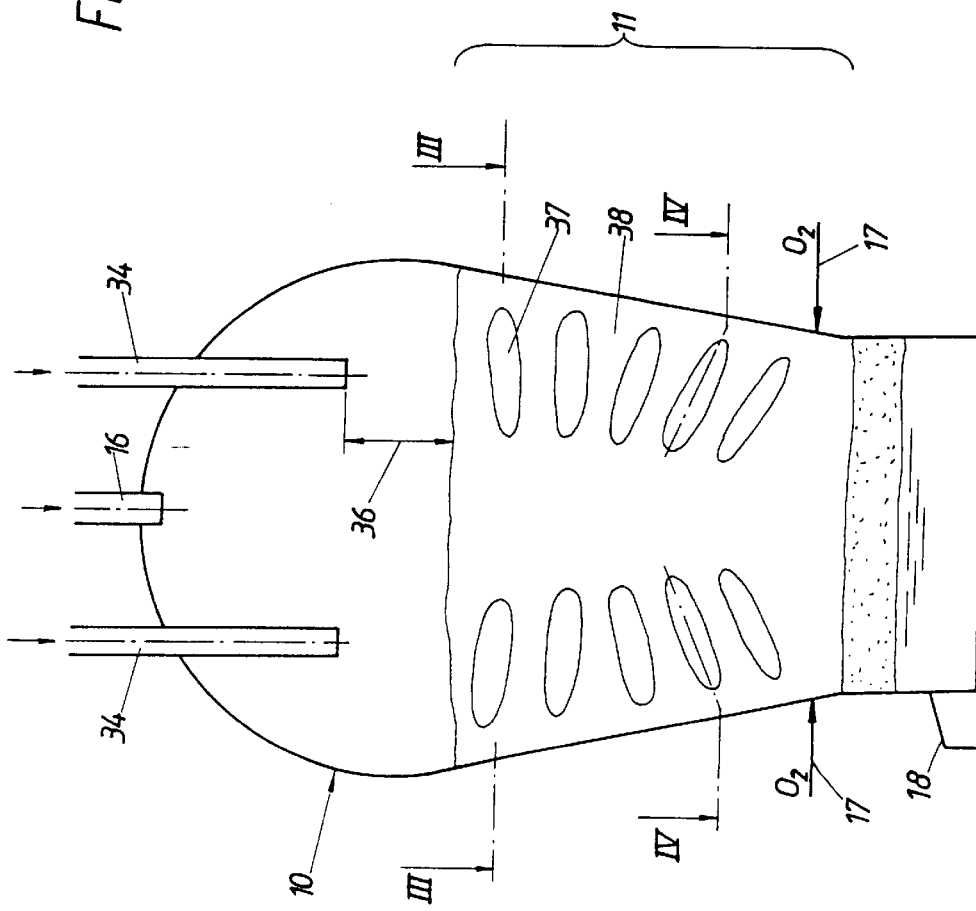
FIG. 2

METHOD AND PLANT FOR PRODUCING IRON FROM LUMPY AND FINE-PARTICULATE SPONGE IRON

BACKGROUND OF THE INVENTION

1. Field of the Invention

The invention relates to a method of producing liquid pig iron or liquid steel pre-products from iron-oxide-containing material, wherein fine-particulate iron-oxide-containing material is reduced to fine-particulate sponge iron by the fluidized bed method by means of a reducing gas in at least one fluidized bed reduction stage and wherein, furthermore, lumpy ore is reduced to lumpy sponge iron in a fixed bed reduction stage which is structurally separated from the fluidized bed reduction stage, and the sponge iron is charged into a melting-gasifying zone and is molten there under supply of carbon carriers and oxygen-containing gas, wherein a CO— and $H_2$-containing reducing gas is generated for reducing the iron-oxide-containing material, and to a plant for carrying out the method.

2. Description of the Related Art

A method of this kind, by which it is feasible not only to process lumpy ore but also fine ore and which enables great possibilities of varying the amounts of lumpy ore and fine ore being charged in relation to the total amount of ore being charged, is known from WO-A-96/12045. In this method, the fine-particulate sponge iron produced from fine ore is briquetted for greater ease of handling and is further processed in a compact steelworks provided, for instance, with electric furnaces and converters. If necessary, the briquetted sponge iron may also be melted down in the melting-gasifying zone, particularly if surplus energy is available in the melting-gasifying zone.

A disadvantage associated with this method is the briquetting of the fine-particulate sponge iron formed from iron ore, but this is accepted in the method of WO-A-96112045, since the charging into the melting-gasifying zone of fine-particulate sponge iron constitutes a special case that is only put into practice if surplus energy is available in the melting-gasifying zone. Generally, WO-A-96/12045 requires forming briquettes from the fine-particulate sponge iron, which will then be particularly easy to handle for shipment to a compact steelworks.

SUMMARY OF THE INVENTION

The invention has as its object to further develop this known method and the plant therefor in such a way that briquetting of the fine-particulate sponge iron will no longer be necessary but wherein the further processing of the fine-particulate sponge iron will not cause difficulties of any kind. In particular, special treatment of the fine-particulate sponge iron separately from the lumpy sponge iron is to be avoided, so that no additional costs, especially costs for additional investments relating to plant components, will incur. Furthermore, the present method provides great flexibility with regard to the use of fine-particulate iron-oxide containing material and lumpy ore.

In accordance with the invention, this object is achieved by charging the fine-particulate sponge iron directly to the melting-gasifying zone in an untreated condition and in fine-particulate form and, there, is melted together with the lumpy sponge iron. As the total fine-particulate sponge iron is melted in the melting-gasifying zone or optionally is completely reduced previously, the melting-gasifying zone in accordance with the invention is designed such that the entire charge of iron-oxide-containing material, hence both the fine-particulate and the lumpy iron-oxide-containing material, can be processed at all times. According to the invention it thus suffices to feed liquid pig iron or liquid steel pre-products to a steelworks, whereby further treatment, i.e. the production of steel, is simplified considerably. As compared to the teachings of WO-A-96/12045, in accordance with the invention not only the briquetting operation but, in the steelworks, also the melting process for sponge iron are omitted.

Advantageously, fine-particulate and lumpy sponge iron are charged to the melting-gasifying zone from above, in free fall.

It is particularly advantageous if fine-particulate and lumpy sponge iron are charged to the melting-gasifying zone alternately, forming charging lentils or layers superposed in a coal bed. Each of the charging lentils or layers thus formed is either formed from fine-particulate sponge iron or from lumpy sponge iron. This offers a particular advantage with respect to the permeability, i.e. the ability to be streamed through by gas, of the piled-up material in the melting-gasifying zone, so that a complete reduction and the melting operation can proceed much more efficiently.

Suitably, fine-particulate and lumpy sponge iron are charged to the melting-gasifying zone via downpipes which project into a calming zone located above the melting-gasifying zone and terminate at a specific distance from the melting-gasifying zone. Hereby, the surface of the material of the material stream supplied into the melting-gasifying zone is maintained sufficiently small to minimize the exchange surface available for dust loss caused by entrainment of dustlike material from the melting-gasifying zone.

In accordance with a further variant, fine-particulate and lumpy sponge iron advantageously are mixed prior to being charged to the melting-gasifying zone and are charged to the melting-gasifying zone in a mixed condition, wherein, suitably, fine-particulate and lumpy sponge iron are charged in the shape of a compact material stream impacting on the melting-gasifying zone, preferably at a solid-matter porosity of above 0.7, in particular at a solid-matter porosity between 0.75 and 0.85. By this method, minimizing of the dust loss is achieved. The surface of the charged material stream is also maintained small hereby and in this way the exchange surface for the dust loss is also minimized.

Preferably, reduction of the fine-particulate iron-oxide-containing material by the fluidized bed method is carried out in two or more stages and reduction of the lumpy ore (lump ore, pellets, sinter) is carried out in a reduction shaft furnace.

A plant for carrying out the method, comprising at least one fluidized bed reactor, wherein the fine-particulate iron-oxide-containing material passes through the fluidized bed reactor streamed through by the reducing gas while forming fine-particulate sponge iron, and comprising a fixed bed reduction reactor for lumpy iron ore, a conveying duct for the lumpy sponge iron formed in the fixed bed reduction reactor departing from the fixed bed reduction reactor, and comprising a melter gasifier having the conveying duct conducting the lumpy sponge iron from the fixed bed reduction reactor opening thereinto and having feed ducts for oxygen-containing gases and carbon carriers as well as a tap for pig iron or steel prematerial and slag, respectively, as well as a reducing-gas feed duct for a reducing gas generated in the melter gasifier which enters the fixed bed reduction reactor or the fluidized bed reactor, and comprising a feed duct for reducing gas as well as an export-gas discharge duct departing from the fixed bed reduction reactor as well as from the fluidized bed reactor, is characterized in that a conveying duct for fine-particulate sponge iron formed in the fluidized bed reactor opens into the melter gasifier directly, i.e. without interposing a further treating-station.

To make it feasible to alternately charge the fine-particulate sponge iron and the lumpy sponge iron, the conveying duct for the sponge iron formed in the fixed bed reduction reactor and the conveying duct for the sponge iron formed in the fluidized bed reactor are each provided with dosing means which also enable closing of the conveying ducts.

To enable mixing of the fine-particulate and the lumpy sponge iron before charging into the melter gasifier, the conveying duct for the sponge iron formed in the fixed bed reduction reactor and the conveying duct for the sponge iron formed in the fluidized bed reactor are flow-connected with each other and from the connection of these conveying ducts a conveying duct departs which is common to the two reduction products and runs into the melter gasifier.

Preferably, a reducing-gas feed duct departing from the melter gasifier enters both the fluidized bed reactor and the fixed bed reduction reactor.

According to a preferred embodiment, two or several fluidized bed reactors are provided which are connected in series.

BRIEF DESCRIPTION OF THE DRAWINGS

The invention will now be described in greater detail with reference to an exemplary embodiment represented in the drawings, wherein

FIGS. 2 to 4 show a melter gasifier in sectional view, with FIG. 2 being a vertical longitudinal section and FIGS. 3 and 4 being cross-sectioned views taken along the lines III—III and IV—IV, respectively.

DETAILED DESCRIPTION OF THE PREFERRED EMBODIMENTS

Figure 1:
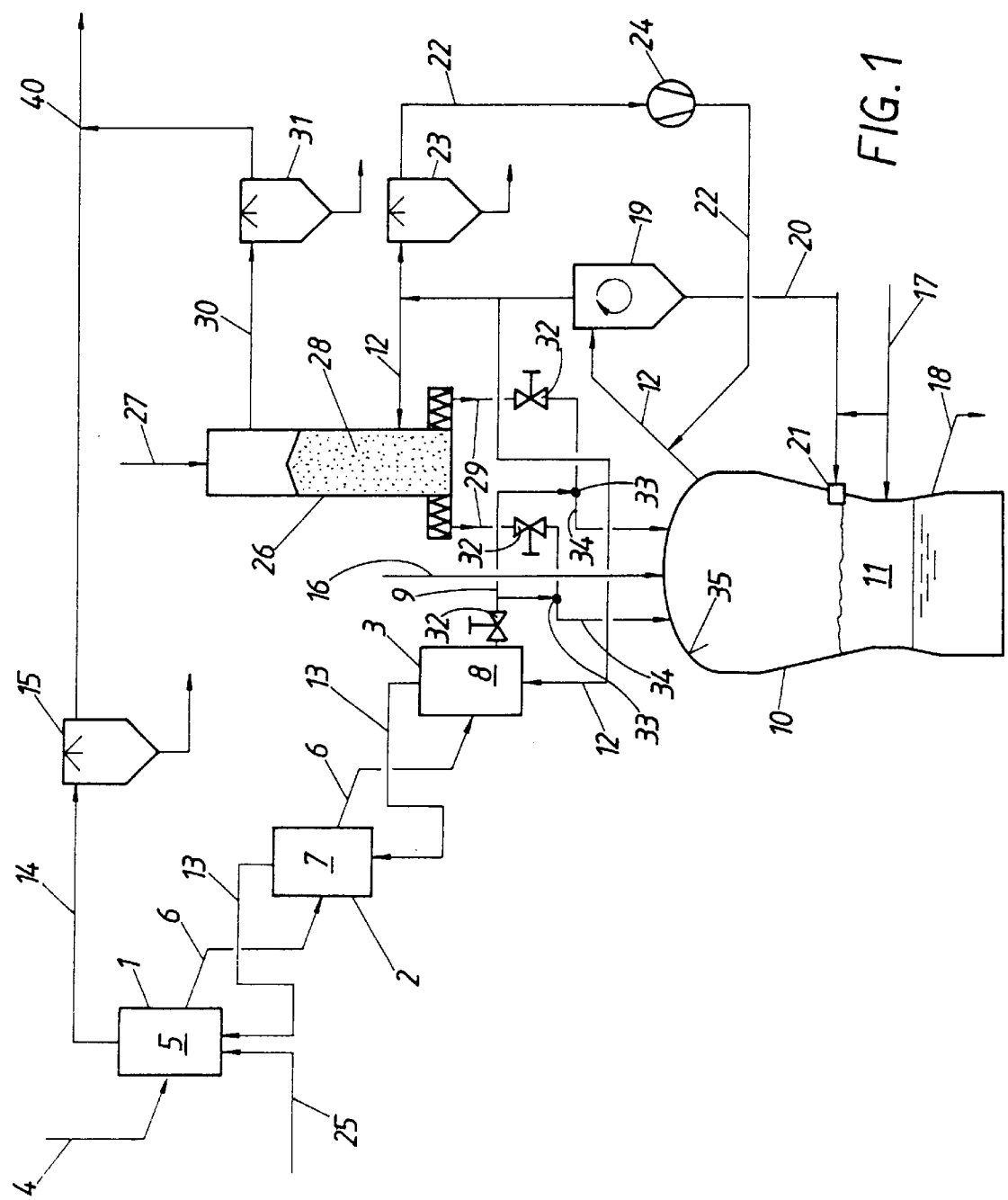
FIG. 1 illustrates a flow sheet of the method according to the invention or of a plant according to the invention.

The plant is provided with three reduction reactors connected in series, which are designed as fluidized bed reactors 1 to 3. Fine-particulate iron-oxide-containing material, for instance fine ore, via an ore feed duct 4 is supplied to the first fluidized bed reactor 1 in which in a preheating stage 5 preheating of the fine ore and possibly pre-reduction take place and is subsequently passed from fluidized bed reactor 1 to fluidized bed reactor 2, 3 via conveying ducts 6. Pre-reduction takes place in a pre-reduction stage 7 in the fluidized bed reactor 2 and final or complete reduction, respectively, of the fine ore to fine-particulate sponge iron takes place in the fluidized bed reactor 3 in a final reduction stage 8, in each case by means of a process gas.

The completely reduced material, i.e. the sponge iron, is passed into a melter gasifier 10 via a conveying duct 9. A CO— and $H_2$-containing process gas serving as a reducing gas is generated from carbon carriers, such as coal, and oxygen-containing gas in the melter gasifier 10, in a melting-gasifying zone 11, prior to which a reducing-gas feed duct 12 is passed into the fluidized bed reactor 3 arranged last in the direction of flow of the fine ore. The reducing gas is then conducted from fluidized bed reactor 3 to fluidized bed reactor 2 to 1 in counterflow to the ore flow, namely via the connecting ducts 13, is discharged from fluidized bed reactor 1 as an export gas via an export-gas discharge duct 14 and subsequently is cooled and scrubbed in a wet scrubber 15. Hereupon it may be supplied to a consumer.

The melter gasifier 10 has a feeding device 16 for solid carbon carriers, a feeding device 17 for oxygen-containing gases and, optionally, feeding devices for carbon carriers that are liquid or gaseous at room temperature, such as hydrocarbons, and for calcined fluxes. In the melter gasifier 10, below the melting-gasifying zone 11, liquid pig iron or liquid steel pre-material and liquid slag, respectively, collect, which are tapped off via a tap 18.

In the reducing-gas feed duct 12 departing from the melter gasifier 10 and ruing into the fluidized bed reactor 3, there is provided a dedustifying means 19, such as a hot gas cyclone, the dust particles separated in this cyclone being supplied to the melter gasifier 10 via the return duct 20, preferably using nitrogen as a conveying means, and via a burner 21 under blowing of oxygen.

The capability to adjust the temperature of the reducing gas to a temperature range (roughly 700 to 900° C.) favorable for the reduction process is achieved by the gas recycling duct 22, and which departs from the reducing-gas feed duct 12 and passes back a portion of the reducing gas into said reducing-gas feed duct 12 via a scrubber 23 and a compressor 24, before the position of the hot gas cyclone 19.

For adjusting the preheating temperature of the fine ore it is feasible to supply an oxygen-containing gas, such as air or oxygen, to the preheating stage 5, i.e. to the fluidized bed reactor 1, via a duct 25, whereby a partial combustion of the reacted reducing gas supplied to the preheating stage 5 takes place.

In accordance with the invention, reducing gas generated in the melter gasifier 10 is also used for producing lumpy sponge iron. To that end, lumpy iron ore and/or iron ore in the form of pellets is charged to a shaft furnace forming a fixed bed reduction reactor 26 from above, via a conveying means such as a conveying duct 27, via a sluice system (not illustrated), optionally together with fluxes, under formation of a moving bed.

The term "moving bed" is understood to refer to a continuously moving material stream, the movable particles of which come into contact with a flow of reducing gas. Preferably, a material stream is utilized which moves continuously downward by gravity.

It is also feasible to provide a reactor incorporating a traveling grate or a rotary tubular kiln as the fixed bed reduction reactor instead of a shaft furnace 26.

The iron ore reduced to sponge iron in a reduction zone 28 within the shaft furnace 26 is carried away together with the fluxes calcined in the reduction zone 28, via conveying ducts 29 departing from the shaft furnace 26, for instance by means of discharge worms, etc. To the upper portion of the shaft furnace 26, an export-gas discharge duct 30 is connected for the export gas forming from reducing gas in the reduction zone 28. The export gas withdrawn via the export-gas discharge duct 30 at first is subjected to purification in a scrubber 31, to free it from dust particles as completely as possible and to reduce the content of water vapor, so that it is subsequently available for further use.

As will be seen from the Figure, the conveying duct 9 from the fluidized bed reactor 3 and the conveying duct 29 from the shaft furnace 26, each of which is provided with dosing units 32 that also enable closing of the ducts, flow together at the mixing sites 33. There, a compact material stream of fine-particulate and lumpy sponge iron preferably having a solid-matter porosity of above 0.7, in particular 0.75 to 0.85, forms in the conveying ducts. This compact material stream is conducted onwards via the conveying ducts 34 entering the melter gasifier 10 in the dome area 35 of the same. The material stream subsequently drops onto the melting-gasifying zone 11 in free fall, wherein discharging of fine particles by the reducing gas formed in the melter gasifier 10 is avoided due to the compactness of the material stream, which the latter shows on account of the thorough mixing of the fine particles with the lumpy sponge-iron particles. An essential feature of the present invention is to keep the surface of the material stream and thus the exchange surface for dust loss small.

From operating a fixed bed reduction reactor it is known that the throughput with a shaft furnace is problematic if the dust content in the reducing gas is too high at the entry into the shaft. The material piled up in the shaft furnace acts like a filter, resulting in a non-uniform gas flow over the shaft cross-section and in an increase in the pressure loss above the material column present within the shaft furnace. Operation of the shaft may become entirely impossible if the material column "sticks" because of the extent of the pressure loss or because bridges of solid matter build up from lumpy and dustlike material over the shaft cross-section, so that the column in the shaft will no longer sink downward through its own weight.

When charging lumpy sponge iron from a reduction shaft and fine-particulate sponge iron from a fluidized bed reduction into a common melter gasifier, special arrangements in terms of process and plant technology are particularly advantageous for keeping the dust content of the reducing gas as low as possible, which tends to increase due to the charging of the fine-particulate sponge iron.

According to a preferred embodiment, the conveying ducts 34 may extend into the interior of the melter gasifier 10 and terminate at a predetermined distance 36 (FIG. 2) above the melting-gasifying zone 11, resulting in a shortened free-falling height of the material stream. In this way, it is feasible to minimize dust losses. So that agglomeration of the fine-particulate sponge iron becomes unnecessary.

According to another preferred variant, the fine-grained material is embedded among the coarse-grained material in the shape of lentils or layers. To build up such lentils or layers within the coal bed, lumpy and fine-grained material is charged alternately. To that end, the charging of the sponge iron is controlled by actuating the dosing units 32 provided in the conveying ducts 9 and 29.

This type of charging is illustrated in FIGS. 2 to 4. Herein, charging of the fine-particulate sponge iron takes place in the shape of lentils, wherein each lentil 37 of sponge iron consisting of fine-particulate sponge iron is embedded in a bed 38 formed from coal and lumpy sponge iron. However, it is also feasible to charge the sponge iron in a mixed condition, i.e. fine-particulate sponge iron simultaneously with lumpy sponge iron or, as described hereinabove, alternately, i.e. fine-particulate sponge iron separately from lumpy sponge iron, wherein both lentils of fine-particulate sponge iron and lentils of lumpy sponge iron are embedded in a coal bed. As can be seen from FIGS. 3 and 4, merging or interlocking of those lentils occupying the same height level takes place as the lentils 37 sink downward in the melting-gasifying zone 11, so that below a specific level the sponge iron is present roughly in the shape of a circular ring 39 in the bed 38.

EXAMPLE

To a plant according to FIG. 1 having a production capacity of 100 t/h pig iron, there are charged 78 t/h lumpy ore and 78 t/h fine-particulate iron-oxide-containing material as well as 38 t/h fluxes. Further, there are charged 104 t/h coal and 56,000 $Nm^3/h$ $O_2$.

The lumpy ore (mainly in the form of hematite) charged to the shaft furnace 26 has a chemical composition as shown in Table I and a grain size distribution as shown in Table II:

TABLE I

| Fe | 64.4% |
|---|---|
| FeO | 0.23% |
| $SiO_2$ | 3.04% |
| LOI (loss on ignition) | 2.0% |
| Moisture | 1.0% |

TABLE II

| −30 mm | 95% |
|---|---|
| −20 mm | 56% |
| −10 mm | 20% |
| −8 mm | 13% |

The fine-particulate iron-oxide-containing material (mainly in the form of hematite) charged to the fluidized bed reactor 1 has a chemical composition as shown in Table III and a grain size distribution as shown in Table IV:

TABLE III

| Fe | 60.5% |
|---|---|
| FeO | 0.19% |
| $SiO_2$ | 6.6% |
| LOI (loss on ignition) | 2.6% |
| Moisture | 1.0% |

TABLE IV

| −8 mm | 100% |
|---|---|
| −5 mm | 83% |
| −1 mm | 45% |
| −0.5 mm | 37% |
| −0.25 mm | 27% |
| −0.125 mm | 16% |

The chemical composition of the dry fluxes is given in Table V:

TABLE V

| CaO | 42.0% |
|---|---|
| MgO | 9.0% |
| $SiO_2$ | 1.0% |
| $Al_2O_3$ | 0.5% |
| Loss on Ignition | Balance |

The chemical composition of the coal charged to the melter gasifier 10 is given in Table VI:

TABLE VI

| C | 74.0% |
|---|---|
| H | 4.4% |
| N | 1.7% |
| O | 8.5% |
| Ashes | 11.0% |
| C-fix | 56.3% |

The pig iron molten in the melter gasifier 10 is of a chemical composition in accordance with Table VII:

TABLE VII

| | |
|---|---|
| C | 4.2% |
| Si | 0.3% |
| Mn | 0.04% |
| P | 0.04% |
| S | 0.02% |
| Fe | Balance |

Reducing gas forming in the melter gasifier 10 by coal gasification incurs in an amount of 179,500 Nm$^3$/h and has a chemical composition as shown in Table VIII.

TABLE VIII

| | |
|---|---|
| CO | 65.6% |
| $CO_2$ | 2.5% |
| $H_2$ | 25.7% |
| $H_2O$ | 1.5% |
| $CH_4$ | 1.0% |
| $N_2$ + Ar | Balance |

After being united at the junction 40, export gas withdrawn from the fluidized bed reactor 1 through the export-gas discharge duct 14 and from the shaft furnace 26 through the export-gas discharge duct 30 incurs in an amount of 178,025 Nm$^3$/h and has a composition as shown in Table IX:

TABLE IX

| | |
|---|---|
| CO | 43.4% |
| $CO_2$ | 31.3% |
| $H_2$ | 17.8% |
| $H_2O$ | 2.0% |
| $CH_4$ | 1.05% |
| $N_2$ + Ar | Balance |

By combining fixed bed reduction and fluidized bed reduction it is feasible to achieve satisfactory behavior at part load. To maintain the fluidized bed, it is necessary to adjust a superficial velocity which is largely constant, whereby the amount of gas will also remain constant. At a constant specific amount of gas (m$^3$ gas/t ore), the throughput in respect of fine ore will also be constant. This combined process flow achieves its flexibility with respect to part-load by varying/reducing the throughput of the fixed bed reduction reactor. For operation in the fixed bed mode it is not necessary—in contrast to the fluidized bed—to keep constant the superficial velocity and, hence, the amount of gas and the throughput.

The invention is not limited to the exemplary embodiment illustrated in the drawings but may be modified in various respects. For instance, the number of fluidized bed zones may be selected freely, as a function of the given requirements. In addition, it is not strictly necessary for the fluidized bed reduction stages and the fixed bed reduction stages to be fed from a single common source of reducing gas. According to a variant also forming part of the invention, either the export gas from the fluidized bed reduction stage or the export gas from the fixed bed reduction stage can be employed for the reduction taking place in the fixed bed or the fluidized bed respectively, namely after preparation, i.e. $CO_2$ elimination and heating.

What is claimed is:

1. Method of producing liquid pig iron or liquid steel pre-products from iron-oxide-containing material, comprising the steps of:

reducing fine-particulate iron-oxide-containing material to fine-particulate sponge iron by the fluidized bed method by means of a reducing gas in at least one fluidized bed reduction stage;

reducing lumpy ore to lumpy sponge iron in a fixed bed reduction stage which is structurally separate from the fluidized bed reduction stage; and charging the fine-particulate sponge-iron and the lumpy sponge iron into a melting-gasifying zone to become molten there under a supply of carbon carriers and oxygen-containing gas, wherein a CO— and $H_2$-containing reducing gas is generated for reducing the iron-oxide-containing material, and wherein the fine-particulate sponge iron produced from the fine-particulate iron-oxide-containing material is charged directly to the melting-gasifying zone in an untreated condition and in fine-particulate form and, there, is melted together with the lumpy sponge iron.

2. Method according to claim 1, wherein the fine-particulate and lumpy sponge iron are charged to the melting-gasifying zone from above, in free fall.

3. Method according to claim 1, wherein the fine-particulate and lumpy sponge iron are charged to the melting-gasifying zone alternately, forming lentils of charge superposed in a coal bed.

4. Method according to claim 1, wherein the fine-particulate and lumpy sponge iron are charged to the melting-gasifying zone via downpipes which project into a calming zone located above the melting-gasifying zone and terminate at a specific distance from the melting-gasifying zone.

5. Method according to claim 1, wherein the fine-particulate and lumpy sponge iron are mixed prior to being charged to the melting-gasifying zone and are charged to the melting-gasifying zone in a mixed condition.

6. Method according to claim 5, wherein the fine-particulate and lumpy sponge iron are charged in a compact material stream impacting on the melting-gasifying zone at a solid-matter porosity of above 0.7.

7. Method according to claim 1, wherein the fine particulate iron-oxide containing material is reduced by the fluidized bed method in two or more stages and the lumpy ore is reduced in a reduction shaft furnace.

8. Plant for carrying out the method according to claim 1, comprising:

at least one fluidized bed reactor through which a flow of fine particulate iron-oxide-containing material passes and through which a stream of reducing gas passes in counterflow so as to form fine-particulate sponge iron;

a fixed bed reduction reactor for lumpy iron ore;

a conveying duct for conveying lumpy sponge iron formed in the fixed bed reduction reactor from the fixed bed reduction reactor;

a melter gasifier to which the conveying duct conducts the lumpy sponge iron from the fixed bed reduction reactor, the melter gasifier having feed ducts for oxygen-containing gases and carbon carriers and a tap for pig iron or steel prematerial and slag, respectively, and further having a reducing-gas feed duct for a reducing gas generated in the melter gasifier to be provided to the fixed bed reduction reactor and/or the fluidized bed reactor;

an export-gas discharge duct departing from the fixed bed reduction reactor and from the fluidized bed reactor; and a conveying duct for conveying fine-particulate sponge iron formed in the fluidized bed reactor into the melter gasifier directly, without interposing a further treating-station.

9. Plant according to claim 8, wherein the conveying duct for the sponge iron formed in the fixed bed reduction reactor and the conveying duct for the sponge iron formed in the fluidized bed reactor are each provided with dosing means which also enable closing of the conveying ducts.

10. Plant according to claim 8, wherein the conveying duct for the sponge iron formed in the fixed bed reduction reactor and the conveying duct for the sponge iron formed in the fluidized bed reactor merge together so as to become flow-connected with each other and to form a common conveying duct which runs into the melter gasifier.

11. Plant according to claim 8, wherein the reducing-gas feed duct departs from the melter gasifier and enters both the fluidized bed reactor and the fixed bed reduction reactor.

12. Plant according to claim 8, wherein two or more fluidized bed reactors are provided which are connected in series.

13. Method according to claim 6, wherein the fine-particulate and lumpy sponge iron are charged in the compact material stream impacting on the melting-gasifying zone at a solid matter porosity between 0.75 and 0.85.

14. Method according to claim 2, wherein the fine particulate iron-oxide containing material is reduced by the fluidized bed method in two or more stages and the lumpy ore is reduced in a reduction shaft furnace.

15. Method according to claim 3, wherein the fine particulate iron-oxide containing material is reduced by the fluidized bed method in two or more stages and the lumpy ore is reduced in a reduction shaft furnace.

16. Method according to claim 4, wherein the fine particulate iron-oxide containing material is reduced by the fluidized bed method in two or more stages and the lumpy ore is reduced in a reduction shaft furnace.

17. Method according to claim 5, wherein the fine particulate iron-oxide containing material is reduced by the fluidized bed method in two or more stages and the lumpy ore is reduced in a reduction shaft furnace.

* * * * *